United States Patent
Kogure (10) Patent No.: US 7,400,872 B2
(45) Date of Patent: Jul. 15, 2008

(54) RADIO RECEIVER FOR SELECTING APPROPRIATE DIVERSITY ANTENNAS BY COMPARING CORRELATION VALUES AND A METHOD FOR THE SAME

(75) Inventor: Toshiharu Kogure, Gunma (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 325 days.

(21) Appl. No.: 11/142,274

(22) Filed: Jun. 2, 2005

(65) Prior Publication Data
US 2005/0272384 A1 Dec. 8, 2005

(30) Foreign Application Priority Data
Jun. 3, 2004 (JP) .............................. 2004-165938

(51) Int. Cl.
H04B 1/60 (2006.01)
H04B 7/00 (2006.01)

(52) U.S. Cl. ..................... 455/277.2; 455/134; 455/275; 455/276.1; 455/67.13; 455/226.1; 455/226.4; 455/296; 455/303; 455/304; 455/132; 455/133; 375/347

(58) Field of Classification Search ................. 455/275, 455/276.1, 277.1, 277.2, 67.13, 226.1, 226.4, 455/296, 303, 304, 134, 132, 133; 375/347
See application file for complete search history.

(56) References Cited

U.S. PATENT DOCUMENTS

| | | | |
|---|---|---|---|
| 5,446,922 A * | 8/1995 | Siwiak et al. ............. | 455/277.2 |
| 5,499,397 A * | 3/1996 | Wadin et al. ............. | 455/277.1 |
| 5,507,035 A | 4/1996 | Bantz et al. | |
| 5,561,673 A * | 10/1996 | Takai et al. ................. | 714/708 |
| 6,032,033 A * | 2/2000 | Morris et al. ............. | 455/277.2 |
| 6,067,449 A * | 5/2000 | Jager ....................... | 455/277.2 |
| 6,141,392 A | 10/2000 | Hoshikuki et al. | |
| 6,847,810 B2 * | 1/2005 | Shen et al. ................ | 455/277.2 |
| 6,925,293 B2 * | 8/2005 | Lindenmeier et al. ..... | 455/276.1 |
| 7,043,218 B1 * | 5/2006 | Ogino ..................... | 455/277.2 |
| 2004/0203460 A1 * | 10/2004 | Hasegawa ................ | 455/67.13 |

* cited by examiner

Primary Examiner—Lana Le
Assistant Examiner—Ping Y Hsieh
(74) Attorney, Agent, or Firm—Studebaker & Brackett PC; Donald R. Studebaker (57) ABSTRACT

In the diversity receiver, the RF switcher switches the received signals to supply them to the RSSI power detector equipped with diversity function. Subsequently, the RSSI power detector with diversity function feeds the RF switcher with an antenna switching signal. According to the determination of antennas at this instance, an IQ start-up signal for starting up the I/Q subsection is produced to make the I/Q subsection operate assuredly in response to a signal intended to receive, without operating the I/Q subsection in response to an erroneous detection of noise during processing therein, thereby eliminating useless operation.

1 Claim, 10 Drawing Sheets

RADIO RECEIVER FOR SELECTING APPROPRIATE DIVERSITY ANTENNAS BY COMPARING CORRELATION VALUES AND A METHOD FOR THE SAME

BACKGROUND OF THE INVENTION

1. Field of the Invention

The present invention relates to a radio receiver and a method of selecting antennas. More specifically, the present invention relates to a radio receiver specifically applicable to for example a radio local area network (LAN), and particularly to a diversity type of receiver for receiving radio packets. The present invention specifically relates to a method of selecting antennas applicable to a diversity type of radio receiver.

2. Description of the Background Art

A diversity receiver scheme for use in wireless or radio transmission systems is adapted to receive electro-magnetic waves with two or more antennas, while selecting appropriate one of the antennas so as to use electromagnetic waves caught by an antenna in a better receiving state. A radio packet receiver employing such a diversity system comprises a high frequency circuit section and a baseband processor section. The high frequency circuit section is provided with a selector switch for selecting radio receive signals caught by appropriate one of the antennas and an analog-to-digital (A/D) converter section for converting an output from the selector switch into a corresponding digital signal.

The selector switch periodically switches the antennas at a predetermined time interval to receive appropriate electro-magnetic waves. The A/D converter section includes an A/D converter for RSSI (Received Signal Strength Indicator) for use in measuring the strength of electromagnetic waves and another A/D converter for I/Q (In-phase/Quadrature) components. The A/D converter section feeds the thus converted digital signals to the baseband section. The baseband section comprises an RSSI power detector subsection, an I/Q detector subsection and an I/Q demodulator subsection.

The A/D converter for RSSI in the high frequency section feeds the converted digital signals to the RSSI power detector subsection. Also, the A/D converter for I/Q components in the high frequency section feeds the converted digital signals to the I/Q detector subsection and the I/Q demodulator subsection.

The I/Q detector subsection, once detecting data, enables the I/Q demodulator subsection to operate. The I/Q demodulator subsection calculates self-correlation on the data received from selected one of the antennas to then store the obtained correlation value. Subsequently, it changes over the selector switch so as to receive waves from the other antenna and then calculates a self-correlation value on the data received from the other antenna. The baseband section compares the calculated self-correlation value with the stored self-correlation value to select one of the antennas which supplies a larger value in order to use thereafter the selected antenna as a receiver antenna.

On the other hand, the signal circuitry for the A/D converter for RSSI and the RSSI power detector subsection is used to detect, when transmitting, whether or not other terminals emit electromagnetic waves. In other words, it is used to determine whether or not the apparatus is allowed to transmit.

More specific diversity systems are disclosed in U.S. Pat. No. 6,141,392 to Hoshikuki et al and U.S. Pat. No. 5,507,035 to Bantz et al. In Hoshikuki et al, the output of a reverse spread demodulation circuit is fed to a changeover control circuit, and the changeover control circuit selects a diversity receiver antenna in response to a correlation output generated when the preamble of a packet is received, while the change-over of the antennas is refrained from during receiving packets to maintain the state generating no bit error, thereby preventing deterioration in transmission efficiency in a multi-path environment.

Bantz et al discloses the control of a multi-path fading in a wireless communication system by dynamically combining a transmitter antenna diversity technique and a receiver antenna diversity technique with each other. Particularly in Bantz et al, there are disclosed antenna selection diversity and switching antenna diversity schemes. In the former scheme, a station is provided with a plurality of separate radio communication transceivers connected to respective, separate antennas spaced at a distance from each other corresponding to at least a fading coherence distance, and the antennas are selected after demodulation and packet buffering. In the latter scheme, a plurality of antennas are periodically switched at a given time interval, as with the system described above.

In the meantime, when receiving electro-magnetic waves in a radio communication environment, there may exist electromagnetic waves acting as interferential waves other than intended waves. In view of the effect of such interferential waves and the like, it is hardly determinable, in simple power detection by the RSSI power detector section, which one of the antennas connected is in its better receiver state. For the purpose of such determination, the diversity system is adapted, as described above, to calculate correlation values for each antenna in the I/Q demodulator subsection and compare the obtained correlation values with each other to thereby select appropriate antennas. However, the I/Q demodulator subsection has a number of operative circuits, which causes a significant amount of electricity to be consumed until an appropriate antennas is selected. In both Hoshikuki et al and Bantz et al, there is disclosed a method of selecting antennas in which one of a plurality of antennas is selected in the diversity to enable reception of better waves, while there is neither disclosure nor suggestion of reduction in electric consumption in selecting antennas.

SUMMARY OF THE INVENTION

It is an object of the present invention to provide a radio receiver and a method of selecting antennas capable of securely selecting antennas in a better receiver state with electricity consumption controlled.

In accordance with the present invention, the radio receiving apparatus comprises a plurality of antennas, a switcher for switching signals received by the antennas, a first selection controller for comparing correlation values for the in-phase/quadrature components contained in the received signals to select one of the antennas, and controlling the switcher, and a second selection controller for measuring the strength of the received signals as indices, and for controlling the selection of the antennas in diversity receiving and controlling the start-up of the first selection controller.

In the radio receiver apparatus in accordance with the present invention, the switcher switches the received signals to supply them to the first selection controller, and the first selection controller carries out selection control of the antennas on the switcher. At that time point, the apparatus supplies a start-up signal for starting up the second selection controller according to the determination of the antennas in order to make the second selection controller assuredly operate in response to a signal intended to receive without proceeding to the operation caused by an erroneous detection of noise and the like during processing therein. It is thereby made possible to eliminate a useless operation as well as an erroneous operation caused by noise and the like.

Further, in accordance with the present invention, a method of selecting one of a plurality of antennas in an infrastructure mode of a radio terminal includes a first step of calculating a correlation value for a current received signal supplied from an antenna first selected, a second step of determining whether or not the correlation value for the current received signal is higher than a threshold value enabling a preset stable reception, and a third step of selecting, when the correlation value is smaller than the threshold value, one of the plurality of antennas on a basis of correlation values for the respective received signals supplied from the plurality of antennas.

With the antenna selecting method in accordance with the invention, when an antenna first selected in an infrastructure mode supplies a received signal having a correlation value higher than a predetermined threshold value enabling stable reception to be obtain, that antenna is continuously used, thereby making it possible to avoid the selection of the antennas by diversity receiving and to control the operation of the I/Q subsection.

Still further according to the invention, the antenna selecting method of selecting one of a plurality of antennas in an infrastructure mode of a radio terminal includes a first step of selecting an antenna by diversity based on correlation values for received signals from the plurality of antennas, a second step of determining whether or not the received signals fed from the plurality of antennas are normal, a third step of holding a value for the received signals of the antennas obtained when the received signals are determined normal in said second step, and a fourth step of selecting one of the plurality of antennas by the diversity when a correlation value for a received signal is obtained which is lower than the held value.

In the antenna selecting method in accordance with the invention, the selection of antennas by diversity takes place only once in the beginning to hold a correlation value obtained based on the normal reception, and uses the selected antenna to reduce the number of selections of antennas, except for the case when a received signal having a value smaller than the held value, thereby making it possible to control operation of the I/Q subsection.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

In the following, embodiments of the radio receiver in accordance with the invention will be described in detail with reference to the appended drawings. The embodiment is directed to a case where the radio receiver of the invention is applied to a diversity receiver 10. The diversity receiver 10 may be adapted to be mounted on a mobile station or terminal, not shown. Parts or portions not directly related to understanding the invention will be omitted from the drawings and descriptive portion.

Figure 1:
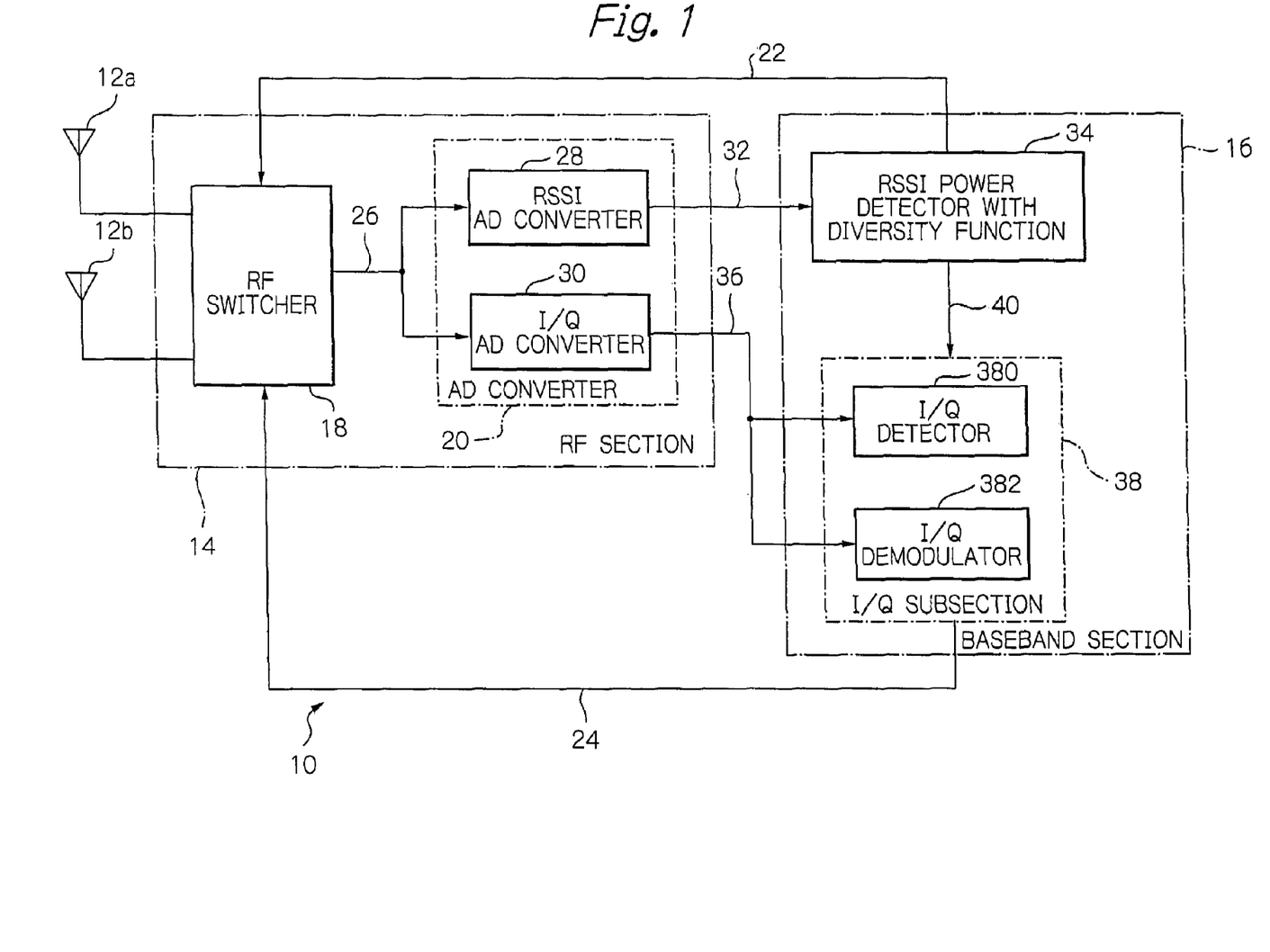
FIG. 1 is a block diagram showing a schematic configuration of an embodiment of a diversity receiver to which a radio receiver is applied in accordance with the present invention.

The diversity receiver 10, as shown in FIG. 1, includes antennas 12a and 12b, a radio frequency (RF) circuit section 14 and a baseband circuit section 16 interconnected as illustrated. The antennas 12a and 12b are space/polarized wave diversity antennas used in a wireless or radio local area network (LAN). From the antennas 12a and 12b, the received signals are fed into the respective parts of the RF circuit section 14.

The RF section 14 comprises an RF switcher 18 and an AD converter 20 interconnected as shown in the figure. The RF switcher 18 has the function of selecting either of the signals fed from the antennas 12a and 12b. The selection takes place in response to antenna switching signals 22 and 24 fed from the baseband circuit section 16. The RF switcher 18 feeds a signal 26 representative of the thus selected antenna to the analog-to-digital (AD) converter 20.

The AD converter 20 has the function of converting the supplied signal 26 into a digital signal corresponding thereto. The AD converter 20 includes an RSSI AD converter 28 and an I/Q (In-phase/Quadrature) converter 30 interconnected as shown. The RSSI AD converter 28 is adapted to convert the signal 26 into a corresponding digital signal 32 to then feed the latter to an RSSI (Received Signal Strength Indicator) power detector with diversity function 34 in the baseband section 16. The I/Q converter 30 also converts the signal 26 into a corresponding digital signal 36 to feed it to an I/Q subsection 38 of the baseband section 16.

The baseband section 16 includes an RSSI power detector with diversity function 34 and an I/Q subsection 38 interconnected as shown. The RSSI power detector with diversity function 34 is adapted to detect whether or not other mobile terminals or station emit electromagnetic waves, when transmitting, on the basis of the fed digital signal 32, and is provided with a diversity function. The RSSI power detector with diversity function 34 generates an antenna switching signal 22 and an IQ start-up signal 40 to feed them to the RF switcher 18 and the I/Q subsection 38, respectively.

Figure 2:
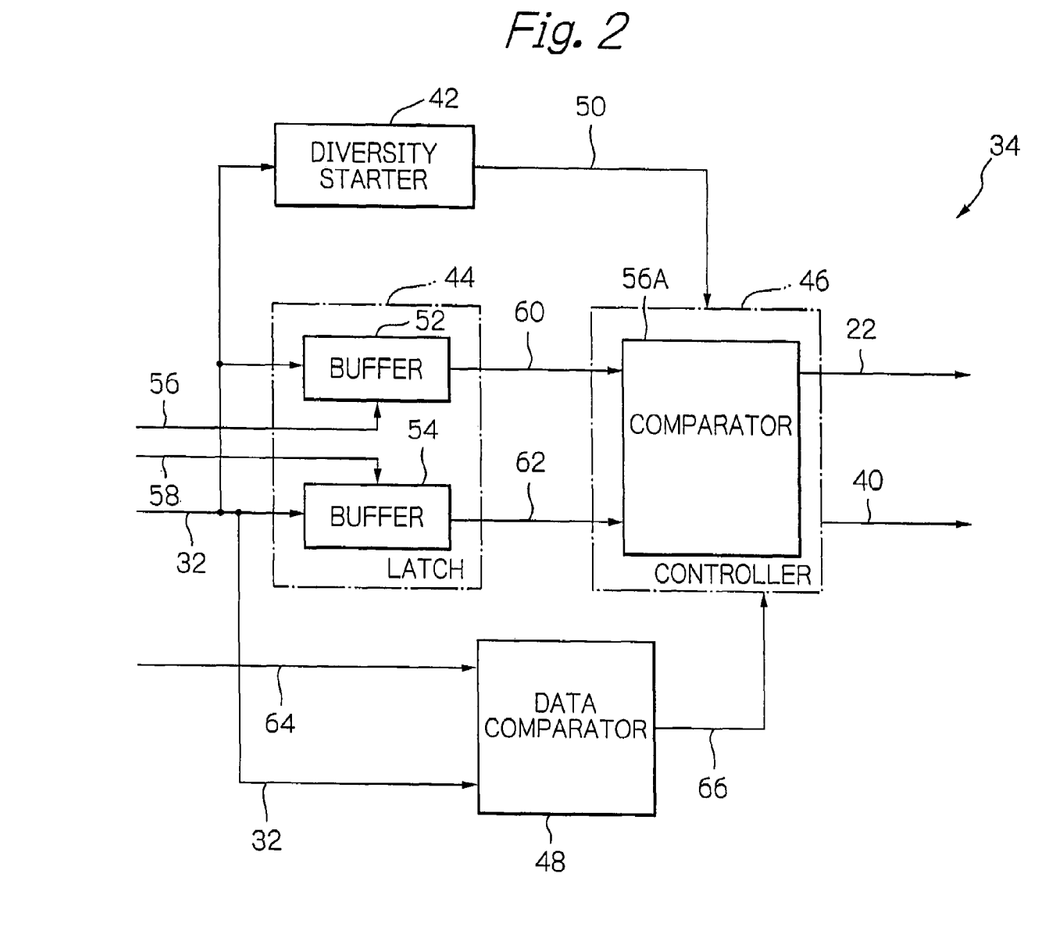
FIG. 2 is a block diagram illustrating an exemplified structure of the RSSI detector subsection with diversity function shown in FIG. 1.

The RSSI power detector with diversity function 34, as shown in FIG. 2, includes a diversity starter 42, a latch 44, a controller 46 and a data comparator 48 interconnected as illustrated. The diversity starter 42 has the function of generating, in response to the digital signal 32 from the AD converter 28, a power detection signal 50 as a start-up signal in the RSSI power detector 34. The diversity starter 42 feeds a controller 46 with the thus generated power detection signal 50.

The latch 44 has the function of temporarily storing digital signals 32 fed from the antennas 12a and 12b, and includes buffer storages 52 and 54. The buffers 52 and 54 are fed with load signals 56 and 58 for loading themselves with digital signals conveyed from the antennas 12a and 12b, respectively. The buffers 52 and 54 output data 60 and 62 to a comparator 56A of the controller 46, respectively. In the following description, signals are denoted with reference numerals for connecting lines where the signals appear.

The controller 46 has the function of generating an antenna switching signal 22 and an IQ start-up signal 40. The controller 46 includes the comparator 56A described above. The comparator 56A is adapted to output the antenna switching signal 22 on the basis of whether or not it is satisfied with a predetermined comparison condition. In the comparator 56A in accordance with the embodiment, a comparison condition has been set that the data 60 should be larger than the data 62. The comparator 56A, when the comparison condition is true, or satisfied, outputs an inverted antenna switching signal 22. The controller 46, when the above described comparison condition is untrue, i.e. not satisfied, outputs a non-inverted antenna switching signal, and determines an antenna depending upon whether or not the result of the data comparator 48 is true, which will be described later, to generate an IQ start-up signal 40.

The data comparator 48 has the function of comparing the fed digital signal 32 with the predetermined power detection threshold value 64 to then determine, on the basis of the comparison, whether or not the detection is erroneous. The data comparator 48 feeds, for example when the digital signal 32 is larger than the power detection threshold value 64, a determination signal 66, having its true value, implicating that the detection is not erroneous.

Referring to FIG. 1 again, the I/Q subsection 38 includes an I/Q detector 380 and an I/Q demodulator 382 interconnected as depicted. The I/Q subsection 38 starts its function in response to the I/Q start-up signal 40, when fed from the RSSI power detector with diversity function 34. The I/Q detector 380 has the function of detecting an in-phase and a quadrature component contained in the fed signal 36. The I/Q demodulator 382 has the function of demodulating the thus fed signal 36 to extract the in-phase and quadrature components therefrom, calculates its self-correlation value for signals obtained from antennas 12a and 12b, and generates an antenna switching signal 24 for selecting an antenna having its correlation value larger. The I/Q subsection 38 feeds the generated antenna switching signal 24 to the RF switcher 18. The I/Q subsection 38 has the function of finally determining an appropriate antenna so that it employs, when the antenna determined in the I/Q subsection 38 differs from the one in the RSSI power detector with diversity function 34, the antenna determined for the I/Q subsection 38.

In addition, it is to be noted that the diversity receiver 10 in accordance with the embodiment forms a physical layer up to the baseband section 16.

Figure 3:
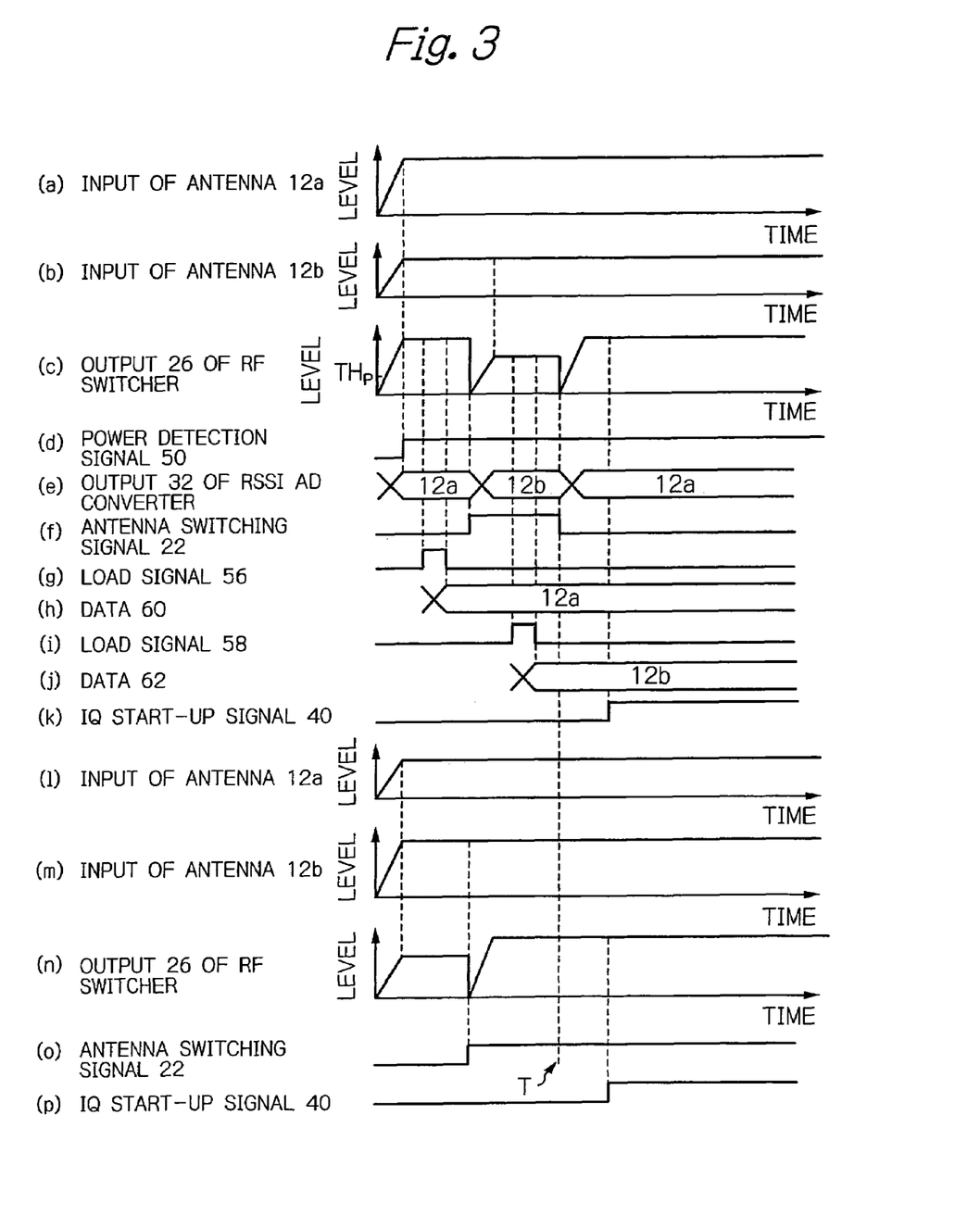
FIG. 3 is a timing chart useful for understanding the operation of the diversity receiver shown in FIG. 1.

In operation, the antennas 12a and 12b catch electro-magnetic waves and feed the RF switcher 18 with the signals thus received, as shown in FIG. 3, lines (a) and (b). The RF switcher 18 provides the RSSI AD converter 28 with output signals 26 periodically switching at a predetermined interval of time, as shown in FIG. 3, line (c). After the diversity starter 42 waits for an output signal 26 having its level substantially equal to or exceeding a predetermined, power detection threshold value, THp. When the diversity starter 42 is fed with the output signal 26 associated with an electromagnetic wave having its level substantially equal to or exceeding the predetermined threshold value, the diversity starter 42 outputs a power detection signal 50, as shown in FIG. 3, line (d). This causes the RSSI power detector 34 to be in its diversity detection mode. In this mode, the RSSI AD converter 28 feeds an output signal 32 shown in FIG. 3, line (e). This feeding of the output signal 32 takes place by switching the RF switcher 18 in response to the antenna switching signal 22 shown in FIG. 3, line (f).

The output signal 32 is fed not only to the diversity starter 42 but to the latch 44. The buffer 52 in the latch 44 is fed with a load signal 56 in FIG. 3, line (g), after a certain period of time elapses in which the output signal 32 stabilizes itself to some extent. The buffer 52 holds the data of the antenna 12a for the output signal 32. Correspondingly, the other buffer 54 holds the data of the antenna 12b in response to the load signal 58, FIG. 3, line (i). The buffers 52 and 54 output the data 60 and 62 shown in FIG. 3, lines (h) and (j) in response to the positive-going edges of the load signals 56 and 58, respectively, different from each other.

The comparator 56A, when the data 60 are larger than the data 62, inverts in level the antenna switching signal 22 to then feed the level "L" of the signal 22, FIG. 3, line (f), to the RF switcher 18. At this instance, the signal received by the antenna 12a shown in FIG. 3, line (c), is fed as the signal 32 to the data comparator 48. The data comparator 48 compares the signal 32 with the power detection threshold value 64 in magnitude to determine whether or not the detection is erroneous due to momentary noise and the like. The data comparator 48 feeds a determination signal 66 to the controller 46. The controller 46 decides the antenna when the received signal is determined normal, although not shown, and generates an I/Q start-up signal 40 for starting up the I/Q subsection 38. The controller 46 produces the I/Q start-up signal 40, which goes positive at timing shown in FIG. 3, line (k), to start up the I/Q subsection 38 effectively receiving the electromagnetic waves.

Contrary to the situation described above, as shown in FIG. 3, lines (l) and (m), when the input level from the one antenna 12a is lower than the input level from the other antenna 12b, the RF switcher 18 produces the output signal 26, as shown in FIG. 3, line (n). The operation of the latch 44 is the same as described above. In such a case, the comparator 56A, since the data 60 are smaller than the data 62, outputs the antenna switching signal 22, depicted in FIG. 3, line (O), without inverting its level. Thereafter, the data comparator 48 compares with the power detection threshold value 64 the signal 22 which received by the antenna 12b, shown in FIG. 3, line (n), and determines whether or not the detection is erroneous due to instantaneous noise or the like. The data comparator 48 feeds the determination signal 66 to the controller 46. The controller 46 decides the antenna when the signal is determined normal, and then generates the I/Q start-up signal 40 for starting up the I/Q subsection 38. The controller 46 produces the generated I/Q start-up signal 40 going positive at timing the same as shown in FIG. 3, line (k), to start up the I/Q subsection 38 to receive the electromagnetic waves, as shown in FIG. 3, line (p).

Figure 4:
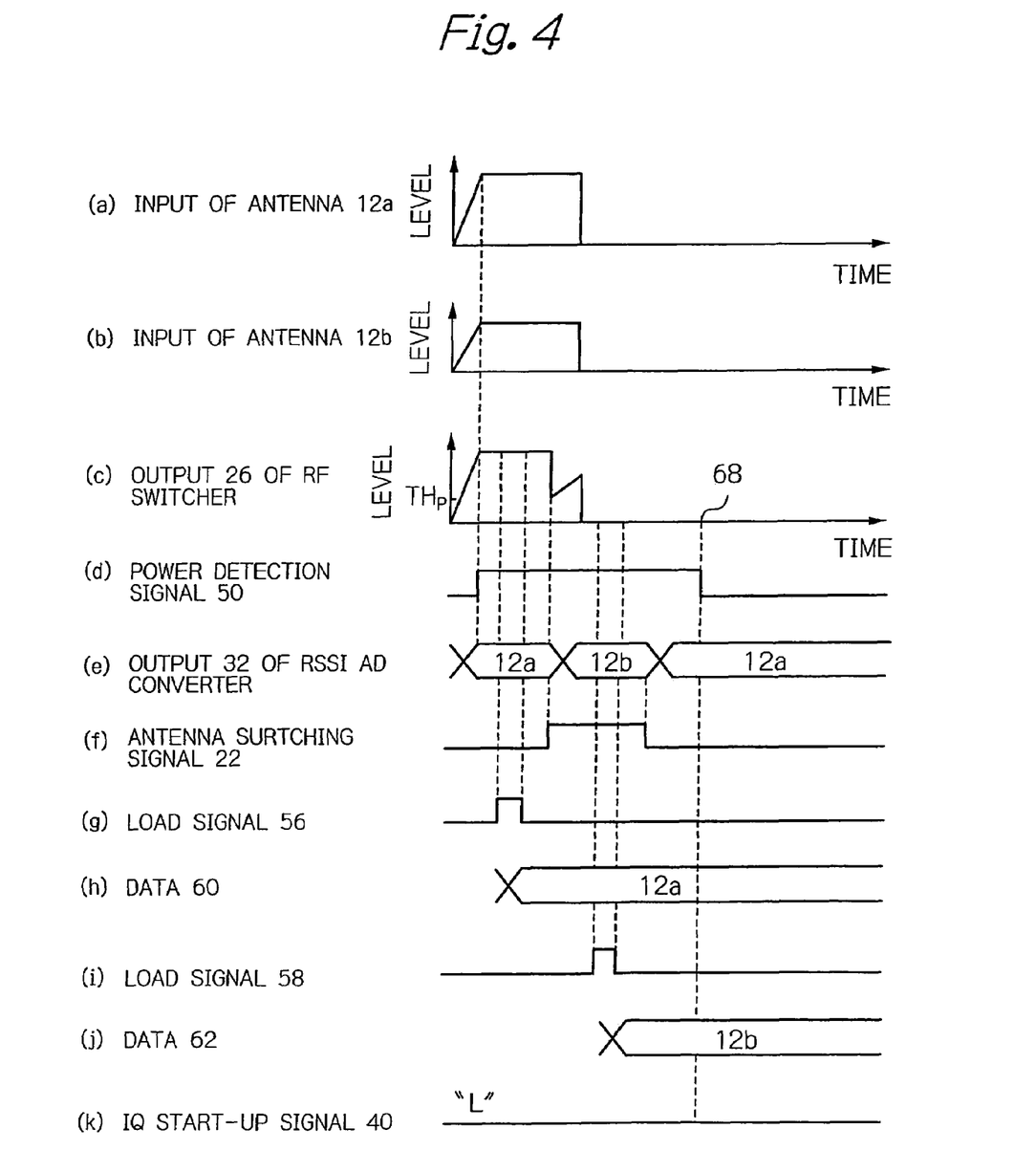
FIG. 4 is a timing chart useful for understanding the operation when momentary noise is received by the diversity receiver shown in FIG. 1.

In the following, the operation in the case subject to momentary noise will be described with reference to FIG. 4. The signals shown in FIG. 4, lines (a) through (k), are the same as shown in FIG. 3, lines (a) through line (k), respectively. The RF switcher 18, once it receives a signal containing noise as shown in FIG. 4, lines (a) and (b), outputs the output signal 26 shown in FIG. 4, line (c). The RSSI power detector 34, upon the receipt of the signal, outputs a power detection signal 50 shown in FIG. 4, line (d). The comparator 56A receives the output signal 32 of the RSSI AD converter 28 responding to an antenna switching signal 22 from the latch 44 to carry out comparison. This comparison determines the antenna. Thereafter, though the determination takes place in the data comparator 48, the output signal 32 at time 68 in FIG. 4, line (c), is smaller than the power detection threshold value 64. Accordingly, the data comparator 48 outputs a determination signal 66 representative of its false state.

The controller 46, on receipt of the determination signal 66, generates no I/Q start-up signal 40 but interrupts the power detection signal 50. The controller 46 returns the diversity receiver 10 to its standby state.

The operation proceeding in this way causes, if momentary noise should occur, the power levels of the input signals to be compared again, after the determination of the antenna, to make determination, thereby not starting up the I/Q subsection 38. Generally, in an application to, for example, household or small-scaled offices, it is considered that the selection of antennas in the RSSI power detector 34 allows obtaining in most cases the same result as in the selection of antennas on the basis of a correlation value in the I/Q. Consequently, the diversity receiver 10, when the RSSI power detector with diversity function 34 is operated for the selection of antennas in place of the I/Q subsection 38 and the I/Q subsection 38 is operated according to a start-up request, reduces the period of operating time of the I/Q subsection 38 which generally consumes high electric power. As a result, electric consumption can be controlled.

Figure 5:
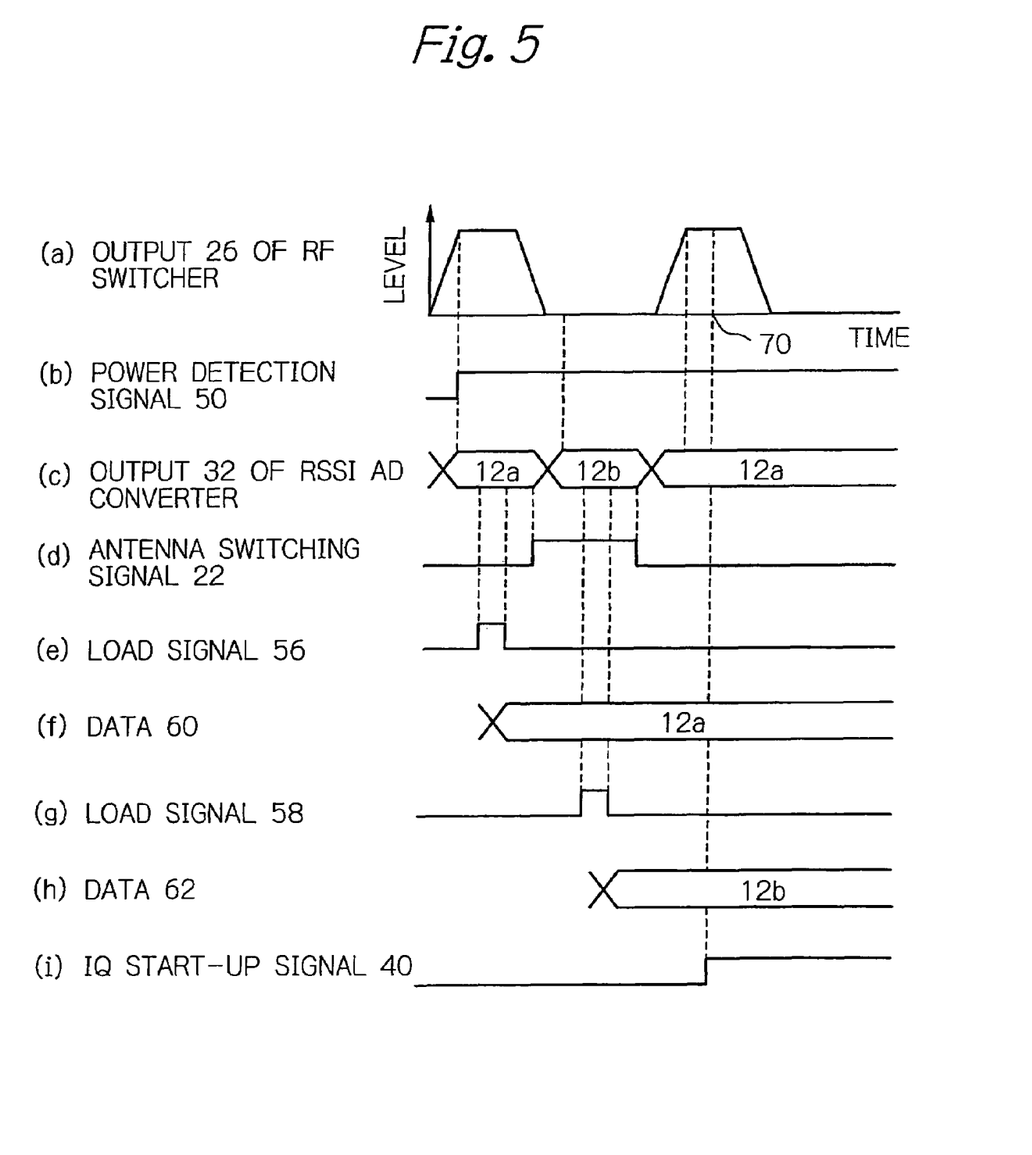
FIG. 5 is a timing chart useful for understanding the erroneous operation of the diversity receiver shown in FIG. 1.

As shown in FIG. 5, line (a), when noise occurs at timing 70 for executing the second power detection, the data comparator 48 determines that it is true, i.e. normal. The diversity receiver 10 outputs the I/Q start-up signal 40, shown in FIG. 5, line (i), causing wrong operation.

Figure 6:
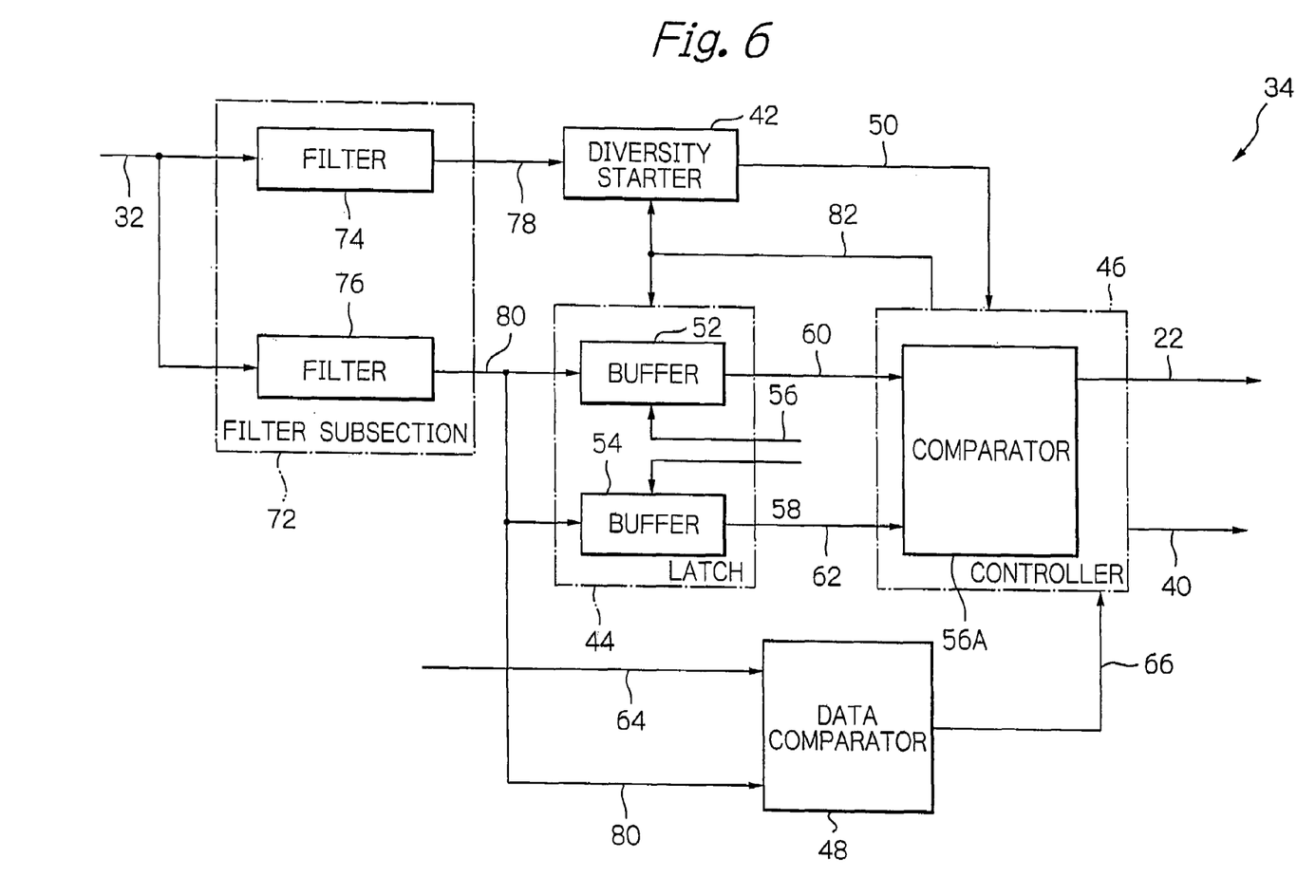
FIG. 6 is a schematic block diagram illustrating another configuration in the RSSI detector subsection with diversity function shown in FIG. 1.

Thus, an alternative embodiment of the diversity receiver 10 will be described to which the radio receiver is applied in accordance with the invention. The diversity receiver 10 shown in FIG. 6 may be the same as shown in and described with reference to FIG. 2 except that the former has a filter subsection 72 and a diversity starter 42 newly provided on the input side in the structural members. The filter subsection 72 includes a pair of filters 74 and 76. The one filter 74 has its high-sensitivity property, while the other filter 76 has its low-sensitivity property. The filter 74 outputs an output signal 78 to the diversity starter 42. The filter 74 disregards the erroneous detection prevention and accelerates the timing at which the diversity starter 42 starts up. This maintains the follow-up operation possible even when severer timing is required of a signal, as prescribed for example in the frame of OFDM (Orthogonal Frequency Division Multiplexing). The other filter 76 delivers output signals 80 to the latch 44 and one input port of the data comparator 48. The filter 76 places an importance on prevention of erroneous detection, but does not take a high follow-up property into consideration. The controller 46 generates reset signals 82 for resetting and feeds them to the diversity starter 42 and the latch 44.

Figure 7:
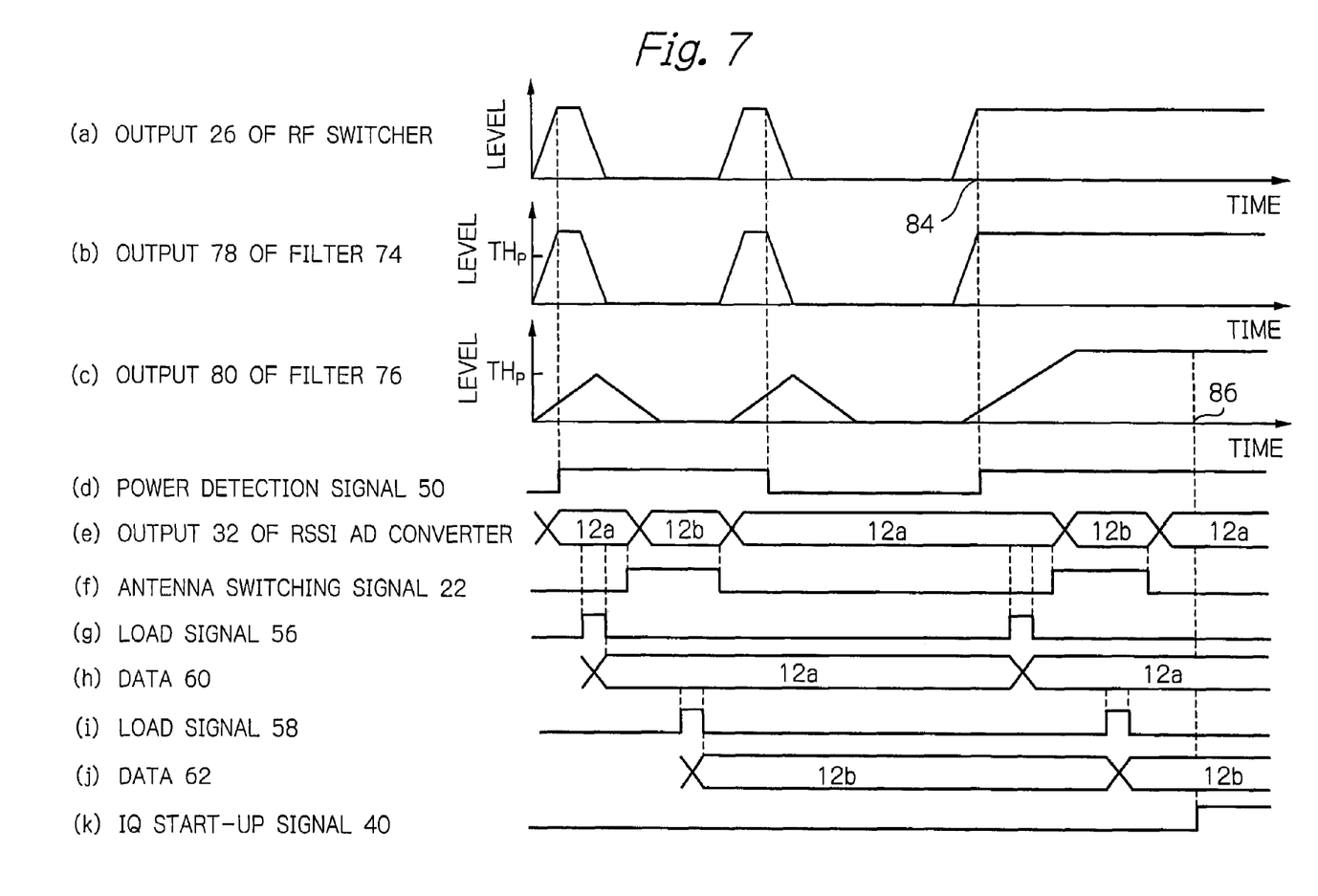
FIG. 7 is a timing chart useful for understanding the operation using the RSSI detector subsection with diversity function shown in FIG. 6 to prevent erroneous operation.

Subsequently, the operation of the diversity receiver 10 will be described with reference to FIG. 7. The output signal 26 of the RF switcher 18, shown in FIG. 7, line (a), includes a portion which follows the timing 84 and is intended to receive and the remaining portion which precedes the timing 84 and includes two noises. The filter 74 produces an output signal 78, as shown in FIG. 7, line (b), which is almost the same as the output signal 26 of the RF switcher 18 thanks to its high-sensitivity property. The filter 76 has its outputs averaged, due to its low-sensitivity property, into, for example, an output waveform as shown in FIG. 7, line (c).

The diversity starter 42 outputs a power detection signal 50, as shown in FIG. 7, line (d), in response to the output signal 78 of the filter 74, and switches the antennas, as shown in FIG. 7, lines (f) through (k), and outputs data loaded in the latch 44 to compare the data 60 with the data 62 by the comparator 56A. Based on the comparison, after the antenna has been determined, the data comparator 48 compares the output signal 80 of the filter 76 with the power detection threshold value 64. At this instance, the output signal 80 has not yet reached to a level of the power detection threshold value 64. The data comparator 48 determines it false and outputs the determination signal 66 to the controller 46 accordingly. The controller 46, on receipt of the determination signal 66, determines that the second signal was detected erroneously due to noise and then generates the reset signal 82. The diversity starter 42 receives the reset signal 82 and negates the power detection signal 50. The diversity starter 42 returns to a receive standby state. Accordingly, the controller 46 generates no I/Q start-up signal 40 over the noise detection period.

Thereafter, the diversity starter 42, when it has received the signal portion essentially intended to receive, outputs the power detection signal 50 in response to the output signal 78. Since there is enough time until the start of data comparison after the determination of an antenna, the output signal 80 of the filter 76 exceeds the power detection threshold value 64 shown in FIG. 7, line (c). The data comparator 48 feeds the determination signal 66 to the controller 46. The controller 46 determines an antenna at this instance to generate and output the I/Q start-up signal 40 for the first time.

In this way, the start-up, determination and the couple of filters 74 and 76 provided cause the length of time for the determination of antennas to be reduced and the requirements for the stability in the selection of antennas to be satisfied.

With the illustrative embodiment shown in and described with reference to FIG. 2, the diversity receiver 10 switching the antennas by means of the I/Q subsection 38 takes time too much longer for detection than the time the frame standards for an OFDM systems require, and thus the diversity operation had to be abolished. However, the diversity receiver 10 in accordance with the illustrative embodiment shown in FIG. 6 can carry out the detection in a shorter time than the detection performed by the I/Q subsection 38, thereby accomplishing the diversity even in an application where the diversity satisfies the frame standards for OFDM systems. Further, the diversity receiver 10 of the embodiments can also respond to erroneous detection due to noise.

The embodiments described above are directed to the control of electric consumption in the physical layer. The control of electric consumption in the I/Q subsection 38 is not limited to the physical layer, but may be carried out in the MAC (Media Access Control) layer, separate from the physical layer. In the following, description will be given to the case where the diversity receiver 10 is actually applied to a radio LAN system and is used in an infrastructure mode for the purpose of operating the I/Q subsection 38.

It has been prescribed in the infrastructure mode that data are transmitted and received in a wireless LAN system to and from an access point. In an application where a personal computer acts a radio terminal, in general, the installation or settings may not be modified or changed. The infrastructure mode of the illustrative embodiment also includes an adhoc mode in which terminals communicate with each other on a one-to-one basis. Accordingly, it is considered that when a correlation value is first employed to determine an antenna, the same state continues in the infrastructure mode. In view of the situation described above on the basis of that concept, the operation may proceed according to a determination on whether or not correlation values are to be compared to thereby compare the correlation values upon each reception of the signals, without the necessity of selecting the antennas.

Figure 8:
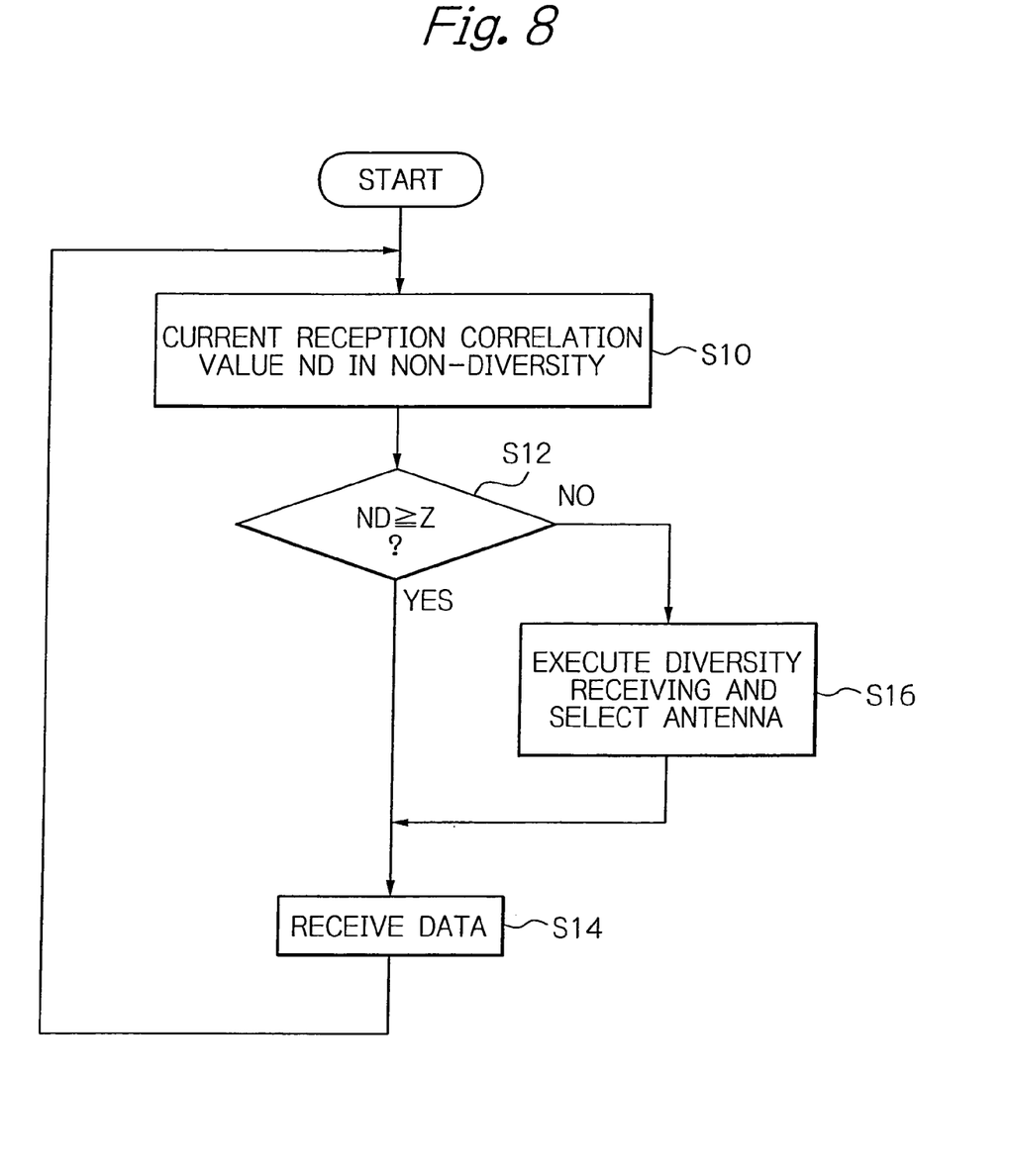
FIG. 8 is a flow chart useful for understanding the operational procedure of an embodiment to which the antenna selecting method is applied in accordance with the present invention.

Now, the methods of selecting antennas in accordance with the present invention will specifically be described. The diversity receiver 10, as shown in FIG. 8, obtains a current reception correlation value ND in the non-diversity receiving, Step S10. More specifically, the receiver 10 receives electromagnetic waves through the antenna that has been set. Subsequently, it is determined whether or not the current reception correlation value ND is larger than the detection threshold value Z, Step S12. The detection threshold value Z is set to a value corresponding to a correlation value with which a stable reception can be expected. When the current reception correlation value ND is equal to or larger than the detection threshold value Z (YES in Step S12), then the control proceeds to the data reception, Step S14. Further, when the current reception correlation value ND is smaller than the detection threshold value Z (NO), then the control proceeds to the selection of the antennas for the diversity receiving, Step S16.

In Step S14, the diversity receiver 10 receives data under the above-described conditions. After the reception, the control returns to the reception of electromagnetic waves through the antennas, Step 10.

Further, in Step S16, the diversity reception is executed to select an antenna. In the selection, for example, an antenna is selected through which the highest reception correlation value can be obtained. Data will then be received through the selected antenna, Step S14.

When the diversity receiver 10 is located near an access point, the current reception correlation value ND is possibly considered larger than the detection threshold value Z, and therefore the possibility may be high in not executing the selection of antennas by diversity receiving. This means that the selection of antennas based on correlation values by the I/Q subsection is eliminated which would have higher electricity consumption. Such use of antennas can reduce electricity consumption in the diversity receiver 10.

Figure 9:
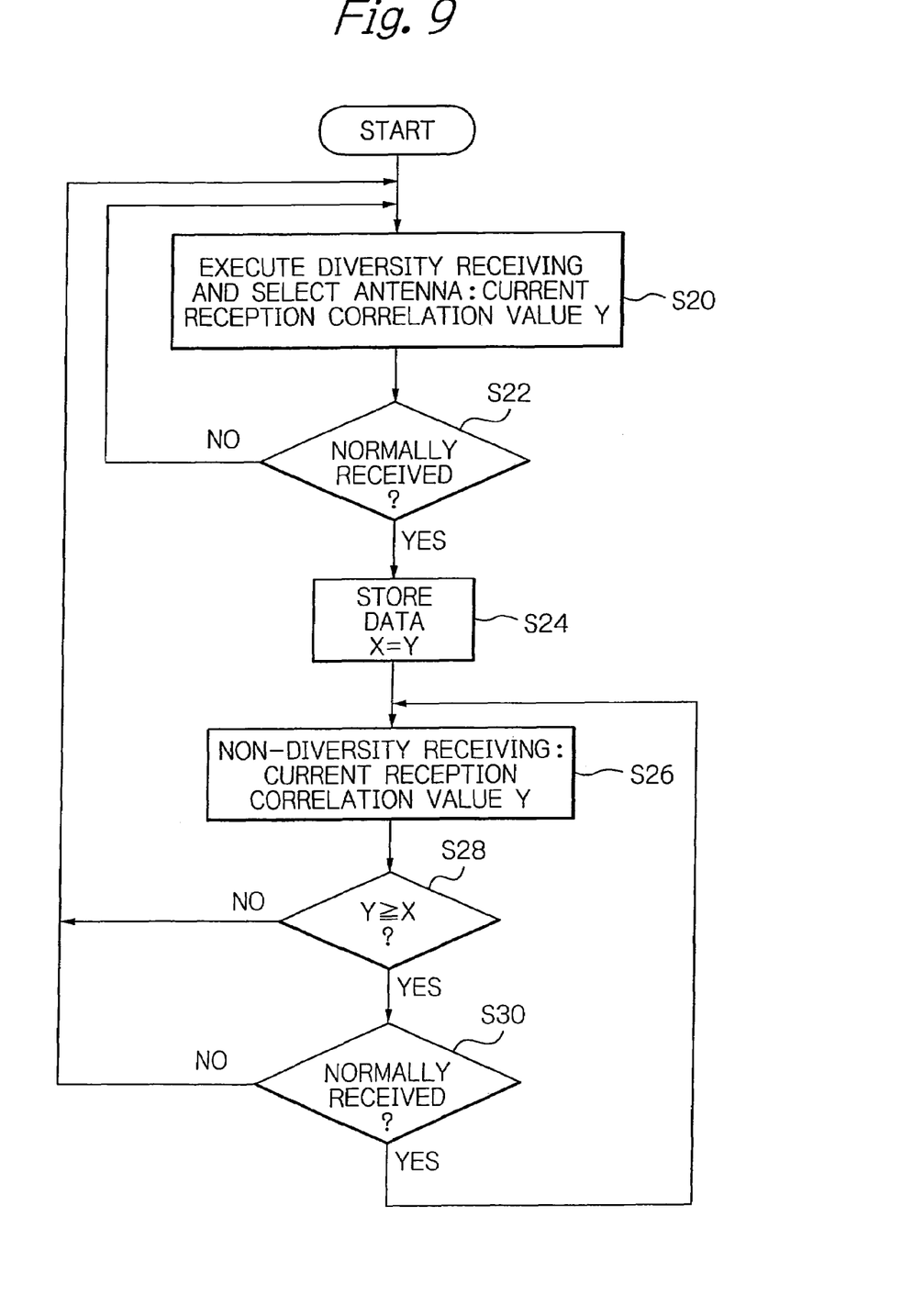
FIG. 9 is a flow chart useful for understanding the operational procedure of an alternative embodiment to which the antenna selecting method is applied in accordance with the present invention.

Well, the operational procedure in the diversity receiver 10 will be described in accordance with an alternative embodiment applied to a radio LAN terminal. In the infrastructure mode of the embodiment including an adhoc mode, access points to and from which mobile terminals transmit and receive data are limited. Accordingly, once such a terminal is connected to the LAN network, it is not so much possible that the distance to the access point significant varies. Diversity receiving is first executed, as shown in FIG. 9, and then an antenna is selected, Step S20. The current reception correlation value Y obtained at this instance is taken in.

Subsequently, it is determined whether or not the receive is normal, Step S22. When it is normal (YES), the control proceeds to data storage, Step S24. When it is abnormal (NO), the control returns to diversity receiving, Step S20.

In Step S24, the data, or the current reception correlation value Y, are stored as the variable X. During the following data transmission and reception, instead of the selection of antennas by diversity, data are received by using the antenna used during the previous data reception, i.e. with the non-diversity receiving, Step S26. The current reception correlation value Y received at this instance is taken in.

It is then determined whether or not the current reception correlation value Y received by non-diversity receiving is equal to or larger than the variable X, Step S28. When that condition is satisfied (YES), the control then proceeds to the determination of the reception state, Step S30. When the condition is not satisfied (NO), the control then returns again to the diversity receiving, Step S20.

It is again determined in Step S30 whether or not the reception is normal. When it is normal (YES), then the control is returned to the non-diversity receiving, Step S26. When it is abnormal, then the control is returned to the diversity receiving, Step S20. As described above, when the correlation value Y is smaller than the variable X, or when the normal reception becomes impossible, it may be considered that the terminal is moving away from the access point. On the basis of that idea, the selection of antennas is executed by means of diversity receiving.

Since it is considered that unless the terminal is moving in such a way the correlation value is related to the variable X, it follows that the correlation value in the I/Q subsection may be compared at the beginning and once only. The thus single comparison allows electric power consumption to be limited.

Further, the procedure consisted of a combination of aforementioned two procedures will be described. As shown FIG. 10, the detection threshold value Z are stored as the variable X, Step S40. Then, the non-diversity receiving is executed, Step S42. The current reception correlation value Y obtained at this instance is taken in.

Figure 10:
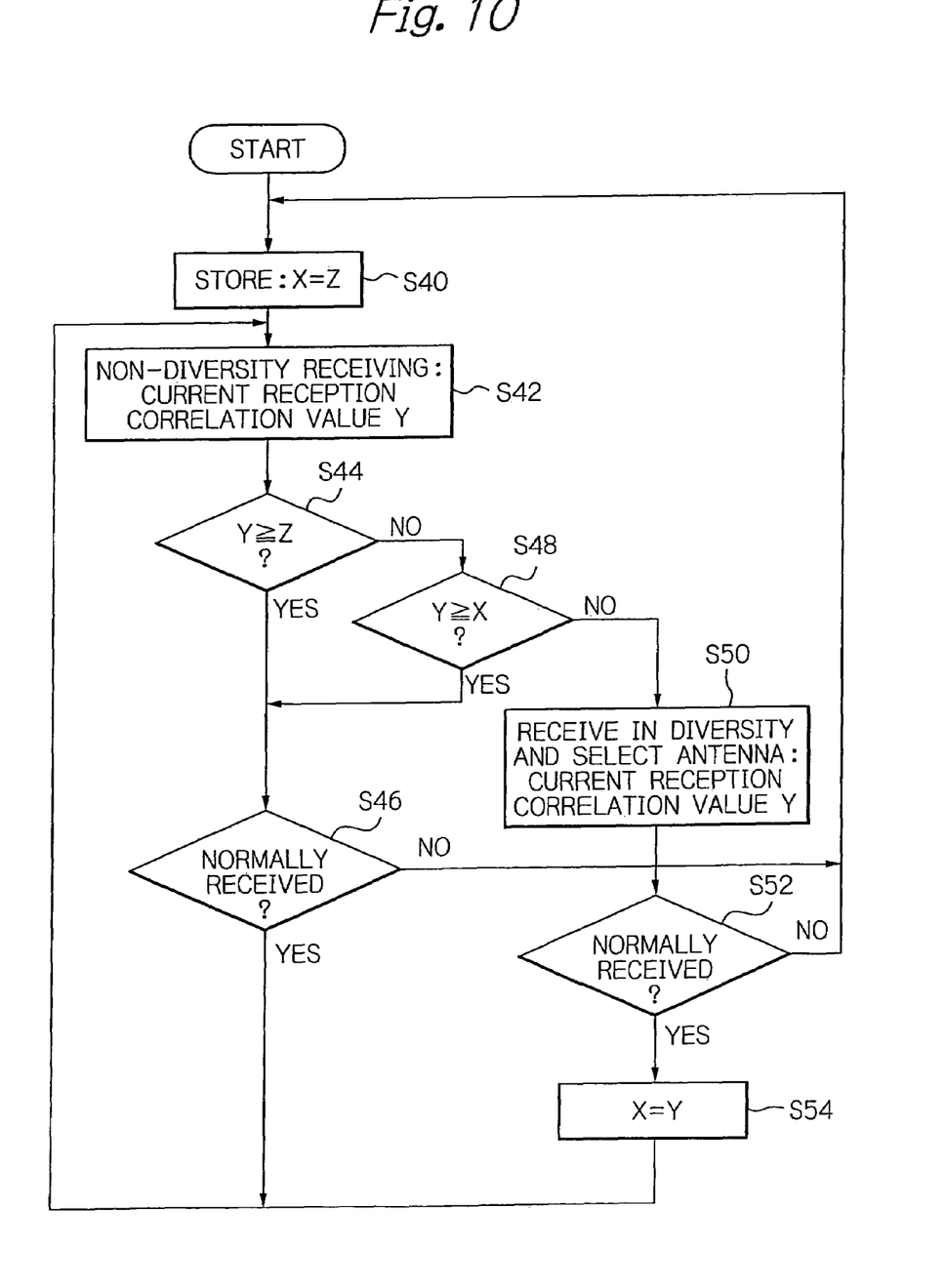
FIG. 10 is a flow chart useful for understanding the operational procedure for another alternative embodiment to which the antenna selecting method is applied in accordance with the invention.

Subsequently, it is determine whether or not the current reception correlation value Y is equal to or larger than the value for the variable X, Step S44. When this condition is satisfied (YES), then the control transfers to the determination of the receiving state, Step S46. When the condition is not satisfied (NO), then the control transfers to a further determination step S48.

For determining the receiving state, it is in turn determined whether or not the receive is normal, Step S46. When it is normal (YES), then the control returns to the non-diversity receiving, Step S42. When it is abnormal (NO), then the control returns to the first processing, Step S40.

For further determination, it is then determined whether or not the current reception correlation value Y in the non-diversity receiving is equal to or larger than the value for the variable X, Step S48. When this condition is satisfied (YES), then the control proceeds to the afore-mentioned determination of the receiving state, Step S46. When the condition is unsatisfactory (NO), then the control proceeds to the diversity receiving, Step S50.

The diversity receiving is executed so as, for example, to select an antenna providing the highest reception correlation value, Step S50. The current reception correlation value Y obtained at this instance will be stored.

Subsequently, it is determined whether or not this diversity receiving is normal, Step S52. If it is normal (YES), then the control proceeds to the data storage, Step S54. If it is abnormal (NO), then the control returns to the first processing, Step S40.

For the data storage, the current reception correlation value Y are stored as the variable X. After the data are stored, the control restores to the non-diversity receiving to continue the reception of the electromagnetic waves.

The processes described above implicate the following meanings: When the received current reception correlation value Y is equal to or larger than the detection threshold value Z that is equal to a detection threshold expected to enable a stable reception of data, the selection of antennas by the diversity receiving is not carried out. If the current reception correlation value Y is smaller than the detection threshold value Z, the selection of antennas by the diversity receiving is carried out. Further, whenever the reception is normal, the current reception correlation value Y will be stored as a reception correlation value as the variable X. The selection of antennas by diversity does not take place, unless the current reception correlation value Y is smaller than both the detection threshold value Z and the variable X.

When the mobile terminal stays near the access point, it is no need of selecting antennas by diversity. Also even when the terminal stays distantly from the access point and can receive the signals normally, selection of antennas by diversity receiving may be executed only once, thereby making it possible to reduce electricity consumption.

The radio receiver in accordance with the invention is desirable to be used in environment, such as household, small-scaled offices and the like. It is desirable in such environment having less noise to accomplish reduced electric power consumption, and in environment having much noise to employ a conventional diversity solution to carry out stable reception of the signals.

The same may be applied in terms of the number of radio terminals. Specifically, it is better to apply the invention to the environment having a smaller number of mobile terminals, whereas to apply a conventional solution to the environment having a larger number of mobile terminals. In addition, the choice may advantageously be made between the solution in accordance with the invention and conventional one in such a fashion that an automatically measured value for the erroneous detection rate with a predetermined detection rate to choose the reception mode in accordance with the invention when the measured value is lower than the predetermined detection rate.

With the illustrative embodiments described above, the diversity receiver 10 is adapted to switch the received signals by the RF switcher 18 to supply them to the RSSI power detector equipped with diversity function 34, subsequently feeds the antenna switching signal 22 from the RSSI power detector with diversity function 34 to the RF switcher 18, and feeds the IQ start-up signal 40 for starting up the I/Q subsection 38 according to the determination of an antenna at this instance. That makes the I/Q subsection 38 operate assuredly in response to a signal desired to receive, without causing the I/Q subsection 38 to respond to an erroneous detection of noise and the like during processing therein, whereby not only a useless operation but also an erroneous operation due to noise and the like are eliminated. Thereby, it is possible to control the operation of the I/Q subsection generally consuming high electric power in the diversity receiver 10, which leads to savings in electricity.

In the RSSI power detection with diversity function 34, the diversity starter 42 generates the power detection signal 50 for measuring an index for the signal strength from the reception signal fed thereto, the latch 44 holds the reception signals 32 fed from the respective antennas, the controller 46 generates the antenna switching signal according to whether or not the conditions preset on the basis of the reception signals 32 held during the period for which the power detection signal 50 is outputted at its level "H" are satisfactory to determine the selection of antennas, and the data comparator 48 determines, based on the comparison between the receive signal 32 fed after the determination with the predetermined threshold value, whether or not the reception signal is erroneously detected, while the controller 46 generates the IQ start-up signal for starting up the I/Q subsection 38 in response to the determination signal 66. Thereby, an erroneous operation due to noise can be prevented and a useless operation of the I/Q subsection 38 can be avoided, resulting in reduced electricity consumption.

In the RSSI power detector with diversity function 34, the filter 72 treats reception signals fed therein with filtration for averaging at different levels of sensitivity, the filter 74 supplies the diversity starter 42 with the receive signal 78 having its property almost the same as the receive signal to be fed therein, the filter 76 makes its sensitivity lower than the filter 74 to then output extensively averaged receive signals 80 to the latch 44 and the data comparator 48, and the controller 46 determines by comparison whether or not the condition preset on the basis of the receive signals 60 and 62 held during the period for which the power detection signal 50 is kept at its level "H", switches the antennas based on the comparison to determine the selection of an antenna, and produces the signals 82 for resetting to the diversity starter 42 and the latch 44 and the start-up signal 40 for starting up the I/Q subsection 38 in response to the determination signal 66 for determining whether or not the receive signal 32 is erroneously detected on the basis of comparison of the receive signal 80 fed in the data comparator 48 after the determination of the antenna with the predetermined threshold value to thereby determine that the second signal was erroneously detected due to noise. A useless operation of the I/Q subsection 38 can thereby be avoided, and requirements can be satisfied for both reduction of the length of time for the determination of antennas and for stability in the determination of antennas.

Further, with the antenna selecting method in accordance with the invention, when the antenna first selected in the infrastructure mode in which the I/Q subsection 38 is rendered operative feeds a receive signal having its correlation value higher than the predetermined threshold value assuring a stable reception, the antenna continues to use without selecting antennas by diversity receiving, thereby making it possible to restrict the operation of the I/Q subsection and reduce its electric power consumption.

In addition to the procedures described above, the antenna selecting method of the invention selects antennas by diversity, determines whether or not the reception is normal on the basis of the selection, holds the obtained correlation value when it is normal, uses the selected antenna, except for the case when a receive signal lower than that value was detected, and reduces the number of selections of antennas by diversity receiving to at least one, thereby making it possible to control the operation of the I/Q subsection and reduce its electric power consumption.

Further, according to the invention, the antenna selecting method selects antennas by diversity only once, holds a correlation value obtained from the normal reception, and uses the selected antenna, except for the case when a receive signal lower than that value was detected, thereby making it possible to reduce the number of selections of antennas by diversity receiving to at least one in the beginning and control the operation of the I/Q subsection to thereby reduce electric power consumption.

The entire disclosure of Japanese patent application No. 2004-165938 filed on Jun. 3, 2004, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A radio receiving apparatus comprising:
a plurality of antennas;
a switcher for switching signals received by said plurality of antennas;
a first selection controller for comparing correlation values for in-phase/quadrature components contained in the received signals to select one of said plurality of antennas, and controlling said switcher; and
a second selection controller for measuring a strength of the received signals as indices, and for controlling a selection of said plurality of antennas in diversity receiving, and for controlling a start-up of said first selection controller,
wherein said second selection controller comprises a filter for filtering the received signals supplied for averaging the received signals at levels of sensitivity different from each other;
said filter comprising:
a first filter for raising the sensitivity in the filtering to output a received signal having a property approximately same as a property of the received signals supplied;
a second filter for reducing the sensitivity lower than the sensitivity of said first filter to output an averaged received signal;
a start-up generator on a basis of an output from said first filter for generating the first start-up signal for enabling measurement of the indices for the strength of the signals;
a holding circuit for holding the received signals supplied from said second filter for the respective antennas;
a determination controller for generating switching of said plurality of antennas, according to whether or not a predetermined condition is satisfactory, on a basis of the received signals held during a period for which the first start-up signal is outputted, and determining the selection of the antennas; and
a determining circuit for determining, on a basis of comparison of the received signals supplied through said second filter after determination of the antennas with a predetermined threshold value, whether or not the received signals are erroneously detected;
said determination controller generating a signal for resetting to said start-up generator and said holding circuit, and a second start-up signal for starting up said second selection controller on a basis of determination of erroneous detection.

* * * * *